United States Patent [19]
Toda

[11] 4,171,829
[45] Oct. 23, 1979

[54] BABY CARRIAGE

[75] Inventor: Tokuzo Toda, Shiroi, Japan

[73] Assignee: Kabushiki Kaisha Tokyo Bebi, Tokyo, Japan

[21] Appl. No.: 904,032

[22] Filed: May 8, 1978

[30] Foreign Application Priority Data

Oct. 8, 1977 [JP] Japan .................. 52/135584[U]
Oct. 25, 1977 [JP] Japan .................. 52/143850[U]

[51] Int. Cl.² ............................................. B62B 11/00
[52] U.S. Cl. ................................... 280/649; 280/650
[58] Field of Search .................... 280/647, 650, 42; 297/45

[56] References Cited

U.S. PATENT DOCUMENTS

| | | | |
|---|---|---|---|
| 4,007,947 | 2/1977 | Perego | 280/650 |
| 4,030,769 | 6/1977 | Peng et al. | 280/650 |
| 4,077,641 | 3/1978 | Perego | 280/650 |
| 4,118,052 | 10/1978 | Cabagnero | 280/650 |

Primary Examiner—Robert R. Song
Attorney, Agent, or Firm—Oblon, Fisher, Spivak, McClelland & Maier

[57] ABSTRACT

A baby carriage constructed of right and left handle rods, front rods and seat rods pivotably connected by folding front and rear X-shaped beams and folding rear operation rods. The front folding beams connect the front rods and the seat rods, while the rear folding beam connects interior ends of the operation rods to movable members slidably mounted on the handle rods.

1 Claim, 10 Drawing Figures

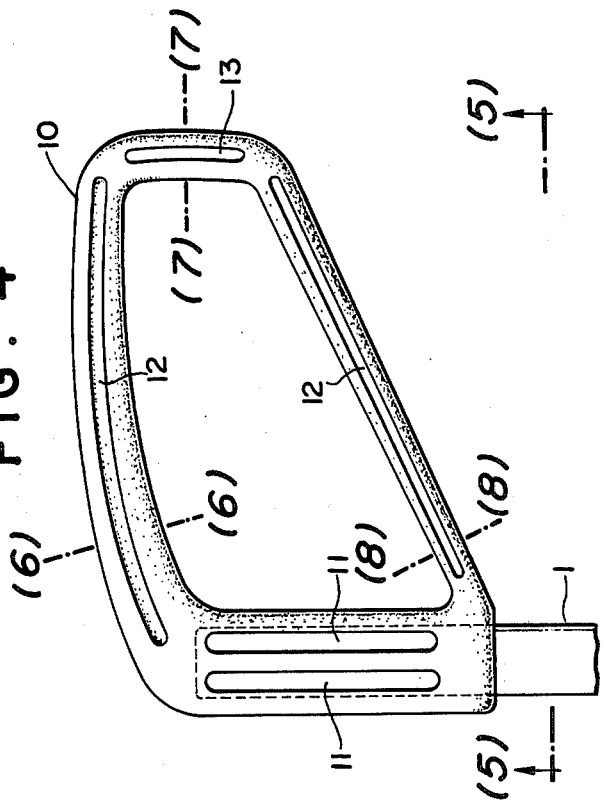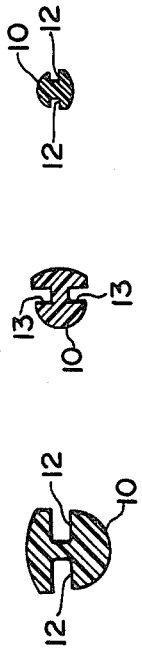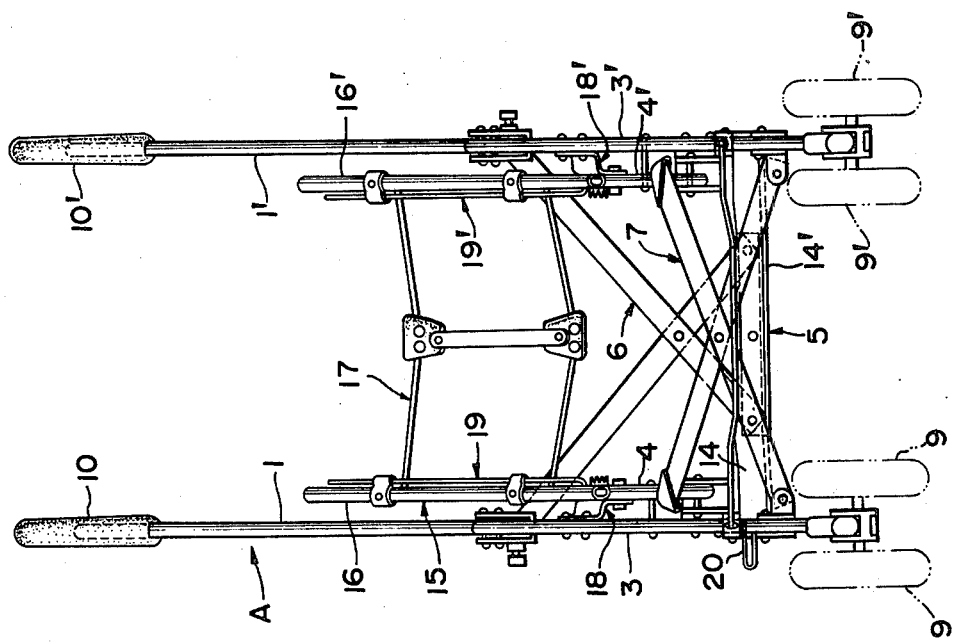

FIG. 9
FIG. 10
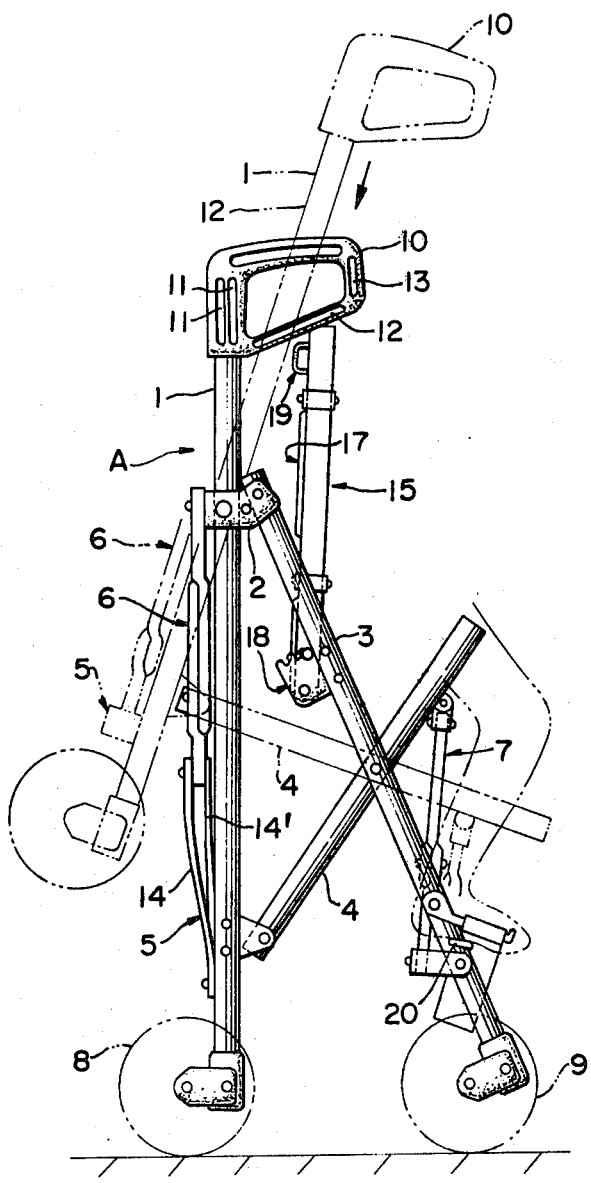
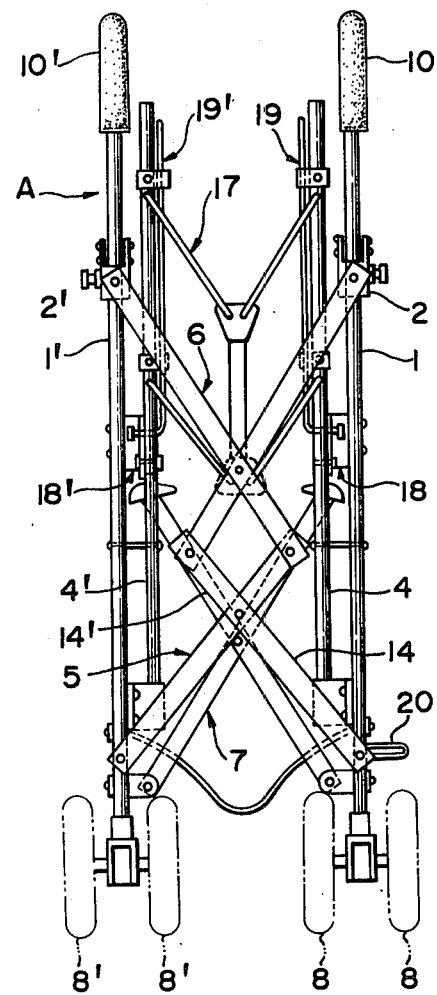

BABY CARRIAGE

FIELD OF THE INVENTION

The present invention relates to a baby carriage, and more particularly to a baby carriage with a carriage frame foldable in both longitudinal and widthwise directions.

SUMMARY OF THE INVENTION

It is an object of this invention to provide a novel compact baby carriage which is easily folded for storage or transportation and which is easily unfolded for use thereof.

This and other objects are achieved by providing a novel baby carriage having left and right handle rods, front rods and seat rods which are pivotably connected by folding front and rear X-shaped beams and folding rear operation rods. The front folding beam connect the seat rods and the front rods. The rear operation rods are each longer than half the width of the unfolded baby carriage and have outer ends connected to lower portions of the handle rods. The inner ends of the rear operation arms are connected to lower ends of the rear folding beams, whose upper ends are connected to movable members slidably mounted on the handle rods, whereby compact folding of the baby carriage is enabled.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 3 is a front elevational view of the baby carriage as shown in FIG. 1;

FIG. 4 is an enlarged side elevational view of the handle portion;

FIG. 5 is a cross-sectional view taken along the line 5—5 in FIG. 4;

FIG. 6 is a cross-sectional view taken along the line 6—6 in FIG. 4;

FIG. 7 is a cross-sectional view taken along the line 7—7 in FIG. 4;

FIG. 8 is a cross-sectional view taken along the line 8—8 in FIG. 4;

FIG. 9 is a side elevational view of the baby carriage as shown in FIG. 1 which is in a folded state; and FIG. 10 is a rear elevational view of the baby carriage as shown in FIG. 9.

DETAILED DESCRIPTION OF THE PREFERRED EMBODIMENTS

Figure 1:
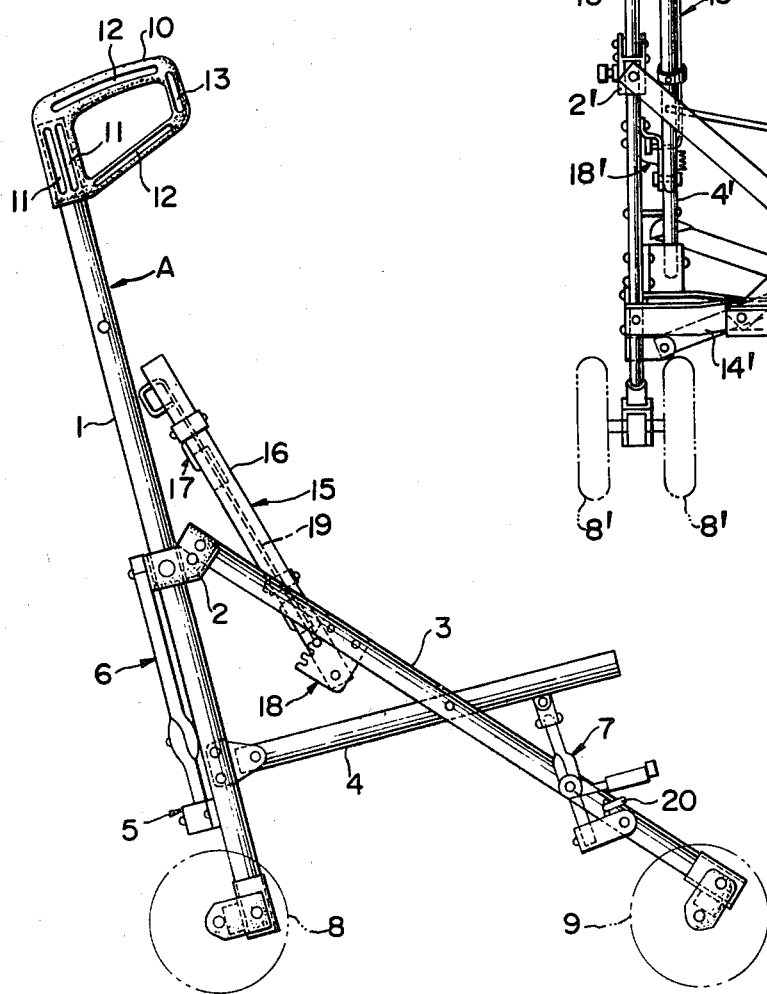
FIG. 1 is a side elevational view of the baby carriage of the present invention.
Figure 2:
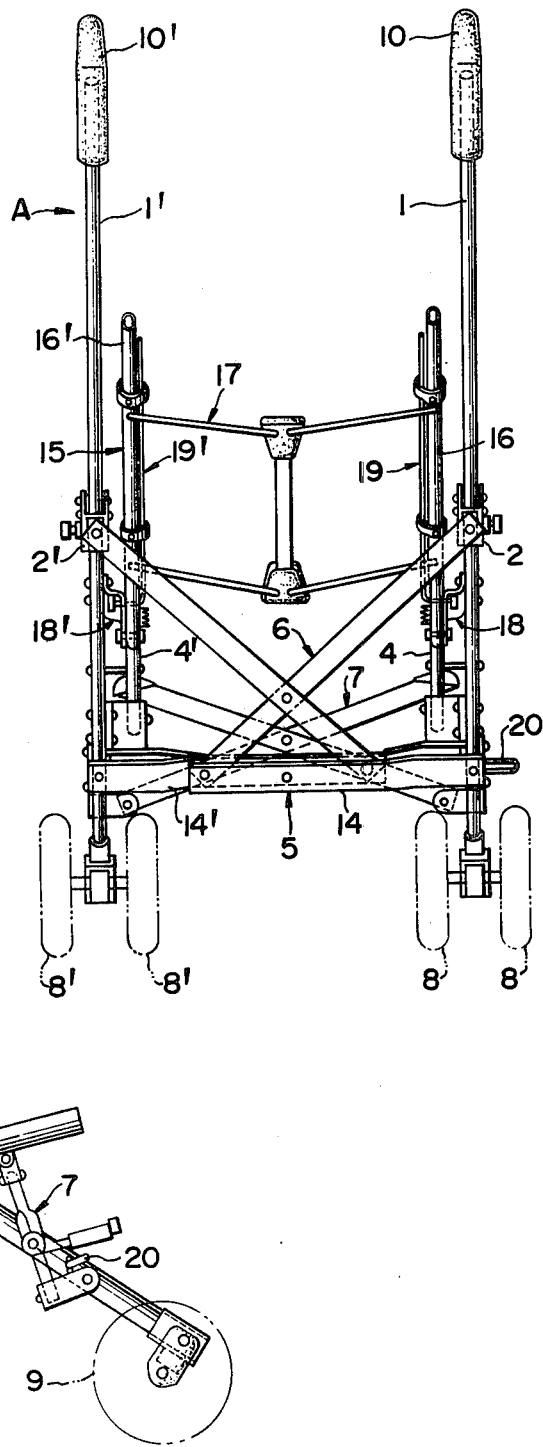
FIG. 2 is a rear elevational view of the baby carriage as shown in FIG. 1.

Referring now to the drawings, wherein like reference numerals designate identical or corresponding parts throughout the several views, and more particularly to FIGS. 1-3 thereof, there is seen the carriage frame A of the baby carriage of the invention, which includes right and left handle rods 1, 1'; front rods 3, 3'; and seat rods 4, 4'.

The handle rods 1, 1' are provided with rotatable rear wheels 8, 8' at the lower ends thereof, and the upper ends of the upwardly extending handle rods 1, 1' are provided with handles 10, 10' made of a synthetic resin. The handles 10, 10' are so made that they have a substantially D-shaped cross section as shown in FIG. 4, and linear portions thereof are fixedly fitted on the upper ends of the handle rods 1, 1' with curved portions thereof forwardly projected. The curved portions of the handles 10, 10' are provided with suitably spaced recesses 11, 12, 13 on both side surfaces thereof as seen in FIGS. 6-8. The linear portions or grip portions of the handles 10, 10' as well as the peripheries of the curved portions thereof have a rough or sandy surface to assure a slip-free grip thereon.

The handle rods 1, 1' are further provided with an operation member 5 both ends of which are pivotally connected to the lower end portions thereof, as well as movable members 2, 2' slidably fitted thereon.

The operation member 5 consists of two rods 14, 14' which are longer than a half of the width of the carriage frame A and which are pivotally connected to each other at the central portion thereof. The outer ends of the rods 14, 14' are pivotally connected to the lower portions of the handle rods 1, 1' to form stationary ends thereof, while the inner ends of the rods 14, 14' are freely movable.

The movable members 2, 2' are made of a synthetic resin the rear half portions of which are annularly formed and slidably fitted on the handle rods 1, 1' and the front half portions of which are formed substantially in the shape of a letter "U" in cross section and pivotally connected to the upper ends of the front rods 3, 3'. To the rear ends of the movable members 2, 2' and the free ends of the operation member 5, an X-shaped foldable rear beam 6 is pivotally connected at four ends thereof.

The front rods 3, 3 are obliquely connected at the upper ends thereof to the handle rods 1, 1' via the movable members 2, 2' and provided with rotatable front wheels 9, 9' at the lower ends thereof as well as a rest frame 15 at the intermediate portion thereof, which rest frame 15 can be inclined in a stepped manner in a plurality of positions.

The rest frame 15 consists of right and left rods 16, 16' and a foldable support frame 17 the four ends of which are pivotally connected to the rods 16, 16'. The rods 16, 16' are provided with an operation means 19, 19' the lower ends of which are connected to locking mechanisms 18, 18' for stopping the rods 16, 16' in each position where the rest frame 15 is locked.

The front rods 3, 3' are provided with a foot rest 20 projected between the lower portions thereof.

The foot rest 20 is made by bending substantially in the shape of a letter "U" a wire of a suitable diameter having the necessary strength, and the end of the linear portions thereof are secured to the lower portion of the front rod 3 with the curved portion thereof projected sideways in the outward direction from the carriage frame A.

The seat rods 4, 4' are connected at the rear ends thereof to the lower portions of the handle rods 1, 1'. The intermediate portions of the seat rods 4, 4' are pivotally connected to the front rods 3, 3' while somewhat raising the portion of the rods 4, 4'. An X-shaped foldable front beam 7 is provided having upper ends pivotally connected to the front end portions of the seat rods 4, 4' and lower ends pivotally connected to the lower end portions of the front rods 3, 3'. Thus, two X-shaped beams 6, 7 are formed on the back and front of the carriage frame A, and are jointly expanded and contracted.

In order to fold the baby carriage having the above-described construction, the operator first puts his foot on the foot rest 20 to hold the carriage frame A, and then grips the handle 10 on the handle rod 1 to incline the carriage frame A so that the rear wheels 8, 8' are lifted with the front wheels 9, 9' alone in contact with the ground surface. When the handle rod 1 is then downwardly pushed, the front rods 3, 3 are slidingly moved with the movable members 2, 2' in the upward direction. At this time, the operation member 5, X-shaped foldable rear beam 6, rest frame 15 and X-shaped foldable front frame 7 are foldingly moved. The carriage frame A is thus folded as shown in FIGS. 9 and 10, with the front wheels 9, 9' and the rear wheels 8, 8' converging together.

Since the upper ends of the X-shaped rear beam 6 are connected to the movable members 2, 2', and, since the lower ends thereof are connected to the free ends of the operation member 5, the rear beam 6 collapses due to the sliding movement of the movable members 2, 2', which allows the carriage frame A to be folded. In addition, since the X-shaped rear beam 6 collapses in conjunction with operation member 5, the degree of widthwise folding the carriage frame A is enhanced since the amount of the upward movement of the X-shaped rear beam 6 is great. Moreover, the carriage frame A can be firmly held by putting the operator's foot on the foot rest 20. Consequently, even when the operator has a child or luggage in one arm thereof, he can fold the carriage frame A by the other hand as he downwardly pushes the handle rod 1.

In order to unfold the carriage frame A, the operator puts his foot on the foot rest 20 of the baby carriage in a folded state to firmly hold the carriage, and then grips the handle 10 to upwardly pull the handle rod 1. Then, the front rods 3, 3' are slidingly moved with the movable members 2, 2' in the downward direction so that the carriage frame A is expanded and stands ready to be used.

In view of the above discussion it is seen that according to the invention, the carriage frame can be easily folded in both widthwise and longitudinal directions by slidingly moving the front rods in the upward direction.

Moreover, since the X-shaped rear beam 6 is foldingly moved with the operation member 5, the vertical movement of the former occurring during folding, the amount of upward movement of the movable member 2 can be reduced. Therefore, the length of the handle rods can be reduced, and this allows the dimensions of the baby carriage to be reduced.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by letters patent of the United States is:

1. A foldable baby carriage comprising:
right and left handle rods (1, 1') having upper and lower end portions;
rear wheels (8, 8') attached to the lower end portion of said handle rods (1, 1');
a pair of movable members (2, 2'), each slidably mounted respectively on one of said handle rods (1, 1'), said movable members having front and rear ends;
an operation member 5 comprising two rods (14, 14') each of which is longer than half the width of the unfolded baby carriage, said rods pivotably connected to each other at a central portion of each of said rods (14, 14'), said rods (14, 14') having outer ends pivotably connected to the lower portions of said handle rods (1, 1'), and freely movable inner ends;
an X-shaped foldable rear beam (6) having lower ends pivotably connected to the inner ends of said rods (14, 14') of said operation member (5) and upper ends pivotably connected to the rear ends of said slidable members (2, 2');
a pair of front rods (3, 3') having upper ends pivotably connected respectively to one of the front ends of said movable members (2, 2'), and lower ends;
front wheels (9, 9') attached at the lower ends of said front rods (3, 3');
a pair of seat rods (4, 4') each having a front end portion pivotably connected respectively to an intermediate portion of each of said front rods (3, 3'), and rear ends, each pivotably connected to the lower portion of said handle rods (1, 1') above said rear wheels; and,
an X-shaped foldable front beam 7 having upper ends pivotably connected to the front ends of said seat rods (4, 4'), and lower ends pivotably connected to the lower end portions of said front rods (4, 4') between the seat rods and the front wheels.

* * * * *